United States Patent
Ha et al.

(10) Patent No.: US 7,822,279 B2
(45) Date of Patent: Oct. 26, 2010

(54) APPARATUS AND METHOD FOR ENCODING AND DECODING MULTI-VIEW PICTURE USING CAMERA PARAMETER, AND RECORDING MEDIUM STORING PROGRAM FOR EXECUTING THE METHOD

(75) Inventors: Tae-hyeun Ha, Suwon-si (KR); Jae-phil Koo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1050 days.

(21) Appl. No.: 11/545,494

(22) Filed: Oct. 11, 2006

(65) Prior Publication Data

US 2007/0081814 A1   Apr. 12, 2007

Related U.S. Application Data

(60) Provisional application No. 60/724,894, filed on Oct. 11, 2005.

(30) Foreign Application Priority Data

Apr. 5, 2006   (KR) .................. 10-2006-0030978

(51) Int. Cl.
*G06K 9/36*   (2006.01)

(52) U.S. Cl. .................................. 382/232

(58) Field of Classification Search ............... 382/103, 382/107, 118, 128, 154, 159, 190, 203, 217, 382/232, 236, 238, 243, 284; 348/139, 153, 348/154, 155, 159
See application file for complete search history.

(56) References Cited

U.S. PATENT DOCUMENTS

| 6,144,701 | A | 11/2000 | Chiang et al. |
| 7,269,292 | B2* | 9/2007 | Steinberg .................. 382/243 |
| 7,286,689 | B2* | 10/2007 | Damera-Venkata et al. . 382/107 |
| 7,463,778 | B2* | 12/2008 | Damera-Venkata ......... 382/236 |
| 2003/0169627 | A1 | 9/2003 | Liu |
| 2003/0202592 | A1 | 10/2003 | Sohn et al. |
| 2006/0222252 | A1 | 10/2006 | Lee |

FOREIGN PATENT DOCUMENTS

| JP | 2004-127239 A | 4/2004 |
| KR | 10-2003-0083285 A | 10/2003 |
| KR | 10-2004-0008456 A | 1/2004 |

* cited by examiner

*Primary Examiner*—Jose L Couso
(74) *Attorney, Agent, or Firm*—Sughrue Mion, PLLC

(57) ABSTRACT

An apparatus and method for encoding and decoding a multi-view picture using a camera parameter are provided. The multi-view moving picture encoding apparatus includes: a multi-view picture receiver which receives the multi-view picture and a plurality of camera parameters; a camera parameter information setting unit which selects a camera parameter to be used for encoding the multi-view picture from among the plurality of the received camera parameters, and sets information which indicates the selected camera parameter; and an encoder which encodes the multi-view picture on the basis of the set information. Therefore, it is possible to enhance multi-view picture encoding efficiency.

24 Claims, 2 Drawing Sheets

APPARATUS AND METHOD FOR ENCODING AND DECODING MULTI-VIEW PICTURE USING CAMERA PARAMETER, AND RECORDING MEDIUM STORING PROGRAM FOR EXECUTING THE METHOD

CROSS-REFERENCE TO RELATED PATENT APPLICATION

This application claims priority from U.S. patent application Ser. No. 60/724,894, filed on Oct. 11, 2005, in the United States Patent and Trademark Office, and Korean Patent Application No. 10-2006-0030978, filed on Apr. 5, 2006, in the Korean Intellectual Property Office, the disclosures of which are incorporated herein in their entireties by reference.

BACKGROUND OF THE INVENTION

1. Field of the Invention

Methods and apparatuses consistent with the present invention relate to encoding and decoding a multi-view moving picture, and more particularly, to encoding and decoding a multi-view picture using a camera parameter.

2. Description of the Related Art

Moving picture encoding according to the MPEG-4 and H.264 standards relates to encoding of a moving picture captured by a single camera, and is aimed at enhancing encoding efficiency. However, in technical fields such as realistic communications or virtual reality etc., a method of capturing a scene using a plurality of cameras, constructing a three-dimensional moving picture having a multi-view, and efficiently compression-encoding and reproducing the constructed multi-view picture, is needed.

However, since related art compression-encoding and reproducing methods relate to compression-encoding and reproducing of pictures captured by a single camera, efficiently applying the related art compression-encoding and reproducing methods to multi-view pictures is difficult.

SUMMARY OF THE INVENTION

The present invention provides an apparatus and method for encoding and decoding a multi-view picture, which are capable of enhancing multi-view picture encoding efficiency using a camera parameter.

The present invention also provides a computer-readable recording medium storing a program for executing a method of encoding and decoding a multi-view picture, which is capable of enhancing multi-view picture encoding efficiency using a camera parameter.

According to an aspect of the present invention, there is provided an apparatus for encoding a multi-view picture including: a multi-view picture receiver which receives the multi-view picture and a plurality of camera parameters; a camera parameter information setting unit which selects the camera parameter to be used for encoding the multi-view picture from among the plurality of the received camera parameters, and sets information which indicates the selected camera parameter; and an encoder which encodes the multi-view picture on the basis of the set information.

The apparatus further includes a camera parameter classifying unit which classifies integrated information respectively, into camera parameter items including at least one of camera arrangement type, translation, a rotation angle, a camera focus distance, and a principle point, when a plurality of camera parameters regarding camera characteristics are received as the integrated information.

The camera parameter information setting unit selects the camera parameter to be used for encoding the multi-view picture, according to the frequency of use or transmission of the plurality of received camera parameters.

The camera parameter information setting unit further sets information indicating whether or not the camera parameter has changed, and the encoder does not encode a camera parameter previously transmitted, if the information indicating whether or not the camera parameter has changed indicates that the camera parameter has not changed.

The information indicating the selected camera parameter is flag information, and is set in a unit of a slice or in a unit of a macroblock of each picture.

The encoder estimates a disparity vector between a predetermined point of a current encoding frame and a corresponding point of a first reference frame using a disparity vector between the predetermined point of the current encoding frame and a corresponding point of a second reference frame when the set information and a camera parameter according to the set information indicate a pure-translation set-up state.

According to another aspect of the present invention, there is provided a method of encoding a multi-view picture including: receiving a multi-view picture and a plurality of camera parameters; selecting a camera parameter to be used for encoding the multi-view picture from among the plurality of received camera parameters; setting information indicating the selected camera parameter; and encoding the multi-view picture on the basis of the set information.

According to another aspect of the present invention, there is provided an apparatus for decoding a multi-view picture including: a camera parameter information extractor which extracts camera parameter information including information set for used camera parameters and the used camera parameters from a multi-view picture encoded using the camera parameters; and a decoder which decodes the multi-view picture on the basis of the extracted camera parameter information, wherein the decoder decodes the multi-view picture on the basis of the extracted camera parameter information if information indicating that a camera parameter has changed is extracted from the camera parameter information extractor, and decodes the multi-view picture using a camera parameter previously received if information indicating that the camera parameter has not changed is extracted from the camera parameter information extractor.

The information set for the used camera parameters is flag information, and is set in a unit of a slice or in a unit of a macroblock of each picture.

According to another aspect of the present invention, there is provided a method of decoding a multi-view picture including: extracting camera parameter information including information set for used camera parameters and the used camera parameters from a multi-view picture encoded using the camera parameters; and decoding the multi-view picture on the basis of the extracted camera parameter information, wherein the decoding of the multi-view picture further comprises decoding the multi-view picture on the basis of the extracted camera parameter information if information indicating that a camera parameter has changed is extracted from the encoded multi-view picture, and decoding the multi-view picture using a camera parameter previously received if information indicating that the camera parameter has not changed is extracted from the encoded multi-view picture.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the appended drawings.

Figure 1:
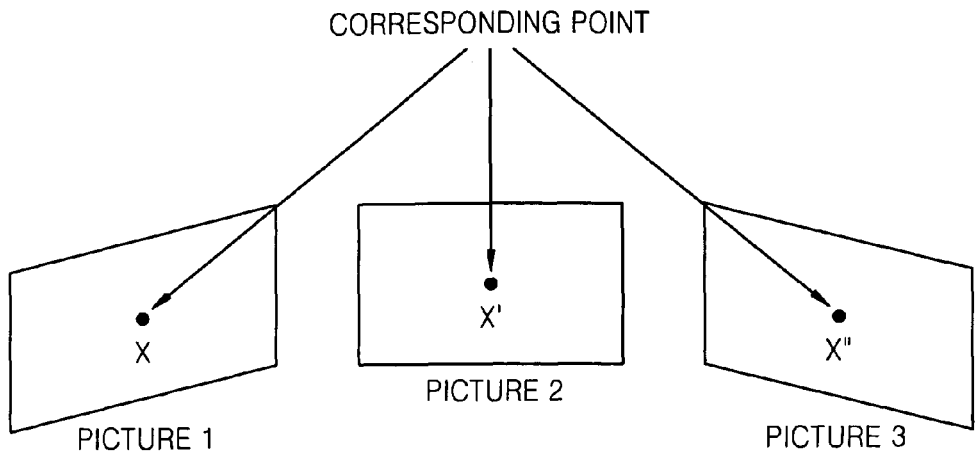
FIG. 1 illustrates a view representing corresponding points on multi-view pictures photographed by a camera set-up, according to an exemplary embodiment of the present invention.

FIG. 1 illustrates a view representing corresponding points on multi-view pictures photographed by a camera set-up, according to an exemplary embodiment of the present invention. When three multi-view cameras photograph a point, the pictures in which the corresponding point is photographed by the three multi-view cameras is shown in FIG. 1. In FIG. 1, the corresponding point of picture 1 is denoted by X, the corresponding point of picture 2 is denoted by X', and the corresponding point of picture 3 is denoted by X".

In FIG. 1, it is assumed that the location of the corresponding point X of Picture 1, which is at a predetermined pixel location in a three-dimensional space of an XYZ coordinate system, is $X=(x, y, 1)^T$. Here, x and y mean values obtained by normalizing values regarding an x coordinate and a y coordinate on an xy coordinate system to values corresponding to a z axis. Thus, the corresponding point X' of Picture 2 and the corresponding point X" of Picture 3 can be calculated by Equations 1 and 2:

$$X' = K'R_{12}K^{-1}X + K't_{12}/Z \quad (1)$$

$$X'' = K''R_{13}K^{-1}X + K''t_{13}/Z \quad (2)$$

In Equations 1 and 2, K, K', and K" represent camera intrinsic parameters for Picture 1, Picture 2, and Picture 3, respectively, $R_{12}$ and $R_{13}$ respectively represent camera rotation parameters of Picture 2 and Picture 3 with respect to Picture 1; $t_{12}$ and $t_{13}$ respectively represent camera translation parameters of Picture 2 and Picture 3 with respect to Picture 1; and Z represents a z coordinate value of the corresponding point photographed by the three multi-view cameras shown in FIG. 1.

Figure 2:
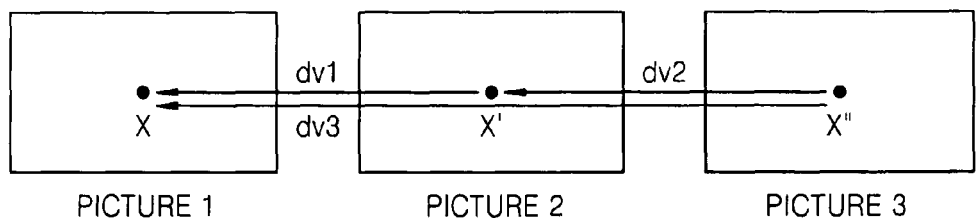
FIG. 2 illustrates a view representing corresponding points on multi-view pictures photographed by a pure-translation camera set-up, according to an exemplary embodiment of the present invention.

FIG. 2 illustrates a view representing corresponding points on multi-view pictures photographed by a pure-translation camera set-up, according to an exemplary embodiment of the present invention.

It is called a "pure-translation set-up" in the case when multi-view cameras having the same camera intrinsic parameter characteristic are aligned in parallel along a straight line with respect to a predetermined object as illustrated in FIG. 2. In this case, R=1 (a unit matrix) and K=K'=K" in Equations 1 and 2.

In FIG. 2, X' and X" represent the corresponding points of Pictures 2 and 3 with respect to a point X on a Picture 1. In case of the pure-translation set-up, a location difference between X and X' corresponds to a disparity vector dv1 between X and X', a location difference between X' and X" corresponds to a disparity vector dv2 between X' and X", and a location difference between X and X" corresponds to a disparity vector dv3 between X and X". In the case of the pure-translation set-up, correlations between X, X', and X" can be expressed as the following Equations 3, 4, and 5:

$$X' = X + Kt_{12}/Z \quad (3)$$

$$X'' = X + Kt_{13}/Z \quad (4)$$

$$X'' = X' + Kt_{23}/Z \quad (5)$$

The following Equation 6 is derived from equations 3 and 4:

$$X' - X = \frac{t_{12}}{t_{13}}(X'' - X) \quad (6)$$

If the values of $t_{12}$, $t_{13}$, and X"−X, that is, dv3 is obtained, X−X', that is, dv1 can be obtained by Equation 6 without using the related art disparity search method.

Meanwhile, the following Equation 7 can be derived from Equations 3 and 5:

$$X'' - X' = \frac{t_{23}}{t_{12}}(X' - X) \quad (7)$$

If the values of $t_{12}$, $t_{23}$, and X'−X, that is, dv1 is obtained, X"−X', that is, dv2 can be obtained by Equation 7 without using the related art disparity search method.

As a result, when only pure-translation exists as the set-up of multi-view cameras and the values of the camera translation parameters are known, a disparity vector between a predetermined point of a current encoding frame and the corresponding point of a first reference frame can be estimated using a disparity vector between the predetermined point of the current encoding frame and the corresponding point of a second reference frame. Multi-view cameras can be arranged in a different form apart from the pure-translation multi-view camera set-up. However, if rectification as a pre-treatment or a post-treatment for encoding a multi-view picture is performed when multi-view cameras are arranged in a different form and are photographing the multi-view picture, the same condition as the pure-translation multi-view camera set-up can be constituted. Accordingly, since disparity vectors can be estimated as described above when the pure-translation multi-view camera set-up is constituted, encoding multi-view pictures using camera parameters corresponding to translation is needed.

Figure 3:
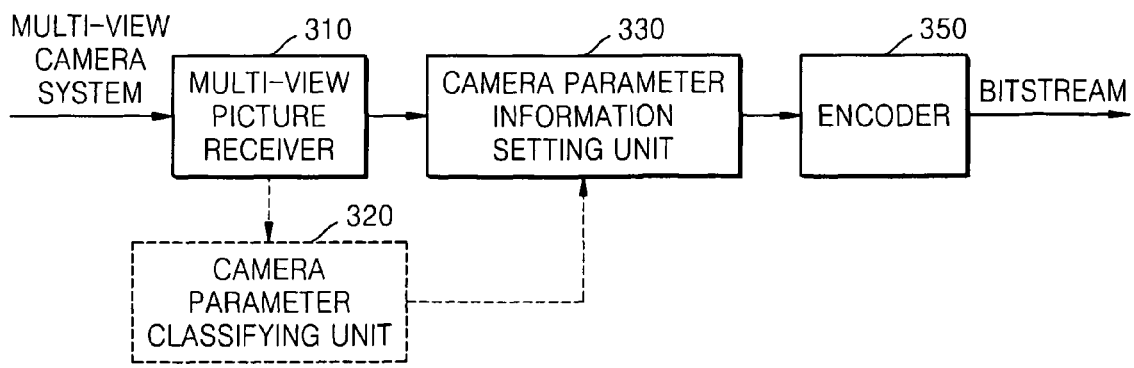
FIG. 3 illustrates a block diagram of a multi-view moving picture encoding apparatus according to an exemplary embodiment of the present invention.

FIG. 3 illustrates a block diagram of a multi-view moving picture encoding apparatus according to an exemplary embodiment of the present invention.

Referring to FIG. 3, the multi-view moving picture encoding apparatus includes a multi-view picture receiver 310, a camera parameter information setting unit 330, and an encoder 350.

The multi-view picture receiver 310 receives a multi-view picture and camera parameters from a multi-view camera system which photographs the multi-view picture. The camera parameters are camera characteristic information regarding respective pictures received from a plurality of cameras. The camera parameters include characteristics pertaining to the camera, such as a camera arrangement type, a translation, rotation angles, camera focus distances, principle points, etc.

The camera parameter information setting unit 330 selects a camera parameter to be used for encoding the multi-view picture, among received camera parameters. The camera parameter can be selected according to predetermined criteria in order to efficiently encode the multi-view picture. For example, the camera parameter information setting unit 330 can select a camera parameter to be used for encoding the multi-view picture according to the frequency of transmission of the received camera parameters.

The camera parameter information setting unit 330 then sets information which indicates the selected camera parameter. For example, the camera arrangement type indicating whether the cameras are arranged in parallel or in a curve form is set by Flag_CP1, the translation is set by Flag_CP2, the rotation angle is set by Flag_CP3, the camera focus distance is set by Flag_CP4, and the principle point is set by Flag_CP5. The information indicating the camera parameter is flag information indicating the selected camera parameter, and can be set in a unit of a slice or in a unit of a macroblock of each picture. When respective flags are set, the Flag_CPn can be set to 1. When the corresponding camera parameter is not used to encode the multi-view picture, the Flag_CPn can be set to 0.

The encoder 350 encodes the multi-view picture on the basis of the set information and generates a multi-view picture bitstream. The encoder 350 encodes the multi-view picture, using the set flag information and the camera parameter based on the flag information. Accordingly, in the multi-view picture encoding apparatus according to the exemplary embodiments of the present invention, by selectively encoding only camera parameters necessarily requiring encoding without encoding and transmitting all camera parameters, multi-view picture encoding efficiency can be enhanced.

There is a case when camera parameters transmitted from the multi-view camera system are integrated, for example, when various camera parameters are transmitted as a matrix. When camera parameters regarding camera characteristics are received as integrated information, the multi-view picture encoding apparatus according to the exemplary embodiments of the present invention can further include a camera parameter classifying unit 320 for classifying the integrated information. This is because the respective camera parameters must be classified according to the items or characteristics pertaining to the camera in order to select the camera parameter to be used for encoding the multi-view picture among the various camera parameters, and set information regarding the selected camera parameter, according to an exemplary embodiment of the present invention. The camera parameter classifying unit 320 classifies the integrated information regarding the camera parameters, respectively, into at least one of camera parameter items including a camera arrangement type, a translation, a rotation angle, a camera focus distance, and a principle point.

Meanwhile, when a selected camera parameter is changed to a different camera parameter and the different camera parameter is selected or when the value of a camera parameter is changed to be the same as the camera parameter item, the camera parameter information setting unit 330 can further set information indicating that the camera parameter has changed. For example, the encoder 350 can set flag information indicating whether or not a camera parameter has changed.

If the flag information indicating whether or not a camera parameter changes indicates that the camera parameter has changed, the encoder 350 encodes the multi-view picture using the changed camera parameter. Meanwhile, if the flag information indicates that the camera parameter has not changed, since a camera parameter previously transmitted from the decoder can be used, the transmitted camera parameter does not have to be encoded. In this manner, transmission of duplicate camera parameters is prevented, thereby enhancing encoding efficiency.

Also, if the set information and the camera parameter according to the set information indicate a pure-translation set-up state, the encoder 350 can estimate a disparity vector between a predetermined point of the current encoding frame and the corresponding point of the first reference frame, using a disparity vector between the predetermined point of the current encoding frame and the corresponding point of the second reference frame.

Figure 4:
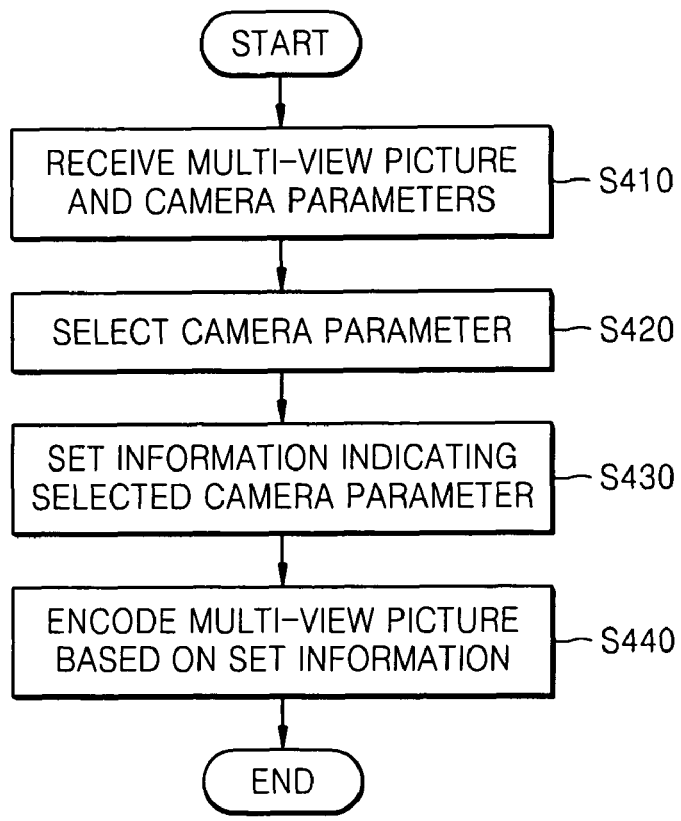
FIG. 4 is a flowchart illustrating a multi-view picture encoding method according to an exemplary embodiment of the present invention.

FIG. 4 is a flowchart illustrating a multi-view picture encoding method according to an exemplary embodiment of the present invention.

In operation S410, a multi-view picture and camera parameters are received. Then, in operation S420, a camera parameter to be used for encoding the multi-view picture is selected among the received camera parameters.

Between operation S410 and operation S420, when camera parameters regarding camera characteristics are received as integrated information, an operation of respectively classifying the integrated information into characteristics regarding camera parameters including at least one of camera arrangement type, a translation, a rotation angle, a camera focus distance, or a principle point can be further included. In operation S420, the camera parameter to be used for encoding the multi-view picture can be selected according to the frequency of transmission of the received camera parameters.

In operation S430, information indicating the selected camera parameter is set. The information indicating the selected camera parameter is flag information, and can be set in a unit of a slice or in a unit of a macroblock of each picture.

In operation S440, the multi-view picture is encoded on the basis of the set information. In operation S440, if the set information and the camera parameter according to the set information indicate a pure-translation set-up state, an operation of estimating a disparity vector between a predetermined point of a current encoding frame and the corresponding point of a first reference frame using a disparity vector between the predetermined point of the current encoding frame and the corresponding point of a second reference frame, can be further performed.

Meanwhile, operation S430 can further include setting information which indicates whether or not the camera parameter has changed when the information indicating the selected camera parameter is set. In this case, in operation S440 of encoding the multi-view picture, if the information, which indicates whether or not the camera parameter has changed, indicates that the camera parameter has not changed, the same camera parameter as that previously transmitted does not have to be encoded.

Figure 5:
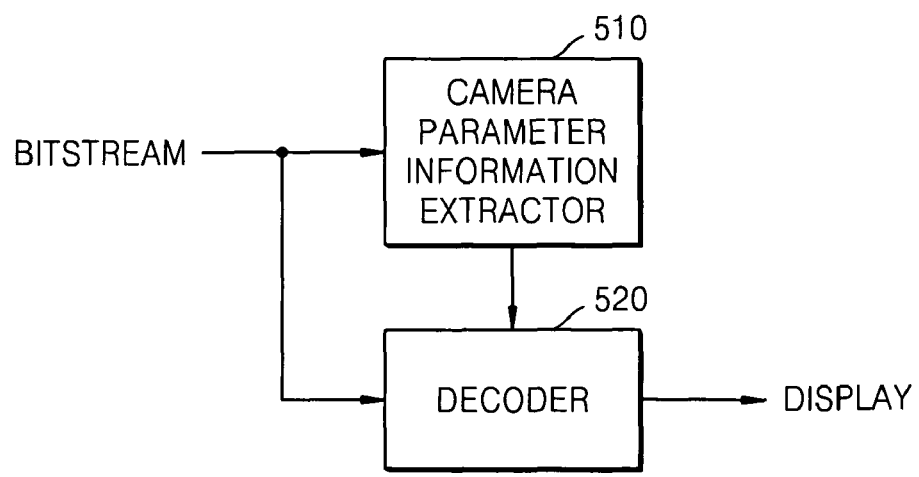
FIG. 5 illustrates a block diagram of a multi-view picture decoding apparatus according to an exemplary embodiment of the present invention.

FIG. 5 is a block diagram of a multi-view picture decoding apparatus according to an exemplary embodiment of the present invention.

Referring to FIG. 5, the multi-view moving picture decoding apparatus includes a camera parameter information extractor 510 and a decoder 520. The camera parameter information extractor 510 extracts camera parameter information from a multi-view picture bitstream encoded using camera parameters. The camera parameter information includes information set for camera parameters used for multi-view picture encoding and camera parameters used for multi-view picture encoding.

The information set for the camera parameters can include information which indicates a camera parameter used for multi-view picture encoding and information which indicates whether or not the camera parameter information has changed. The decoder 520 adaptively decodes the multi-view picture on the basis of the extracted camera parameter information. The decoded multi-view picture is output to a display unit.

If information indicating that the camera parameter has changed is extracted from the camera parameter information extractor 510, the decoder 520 decodes the multi-view picture on the basis of the extracted camera parameter information. If information indicating that the camera parameter has not changed is extracted, for example, if information indicating that the camera parameter has changed is a disabled value, the decoder 520 decodes the multi-view picture using the received camera parameters. The information set for the used camera parameter is flag information, and can be set and received in the unit of a slice or in the unit of a macroblock of each picture.

The multi-view picture encoding method and the multi-view moving decoding method, according to the present invention, can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the exemplary embodiments of the present invention, there are provided an apparatus and method for encoding a multi-view picture, which are capable of enhancing multi-view picture encoding efficiency by selectively encoding only camera parameters necessarily required for encoding without encoding and transmitting all camera parameters.

Also, according to the exemplary embodiments of the present invention, there are provided a method and apparatus for decoding a multi-view picture encoded using camera parameters.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for encoding a multi-view picture comprising:
    a multi-view picture receiver which receives the multi-view picture and a plurality of camera parameters; and
    a computer readable storage medium having stored thereon a camera parameter information setting unit and an encoder;
    wherein the camera parameter information setting unit selects a camera parameter to be used for encoding the multi-view picture from among the plurality of the received camera parameters, and sets information which indicates the selected camera parameter; and
    wherein the encoder encodes the multi-view picture on the basis of the set information.

2. The apparatus of claim 1, further comprising a camera parameter classifying unit which classifies integrated information, respectively, into camera parameter characteristics including at least one of camera arrangement type, translation, a rotation angle, a camera focus distance, and a principle point, when a plurality of camera parameters regarding camera characteristics are received as the integrated information;
    wherein the camera parameter classifying unit is stored on the computer readable storage medium.

3. The apparatus of claim 1, wherein the camera parameter information setting unit selects the camera parameter to be used for encoding the multi-view picture, according to a frequency of transmission of the plurality of the received camera parameters.

4. The apparatus of claim 1, wherein the camera parameter information setting unit further sets information which indicates whether or not the camera parameter has changed, and
    the encoder does not encode a camera parameter previously transmitted, if the information which indicates whether or not the camera parameter has changed indicates that the camera parameter has not changed.

5. The apparatus of claim 1, wherein the information which indicates the selected camera parameter is flag information, and is set in a unit of a slice or in a unit of a macroblock of each picture.

6. The apparatus of claim 1, wherein the encoder estimates a disparity vector between a predetermined point of a current encoding frame and a corresponding point of a first reference frame using a disparity vector between the predetermined point of the current encoding frame and a corresponding point of a second reference frame when the set information and a camera parameter according to the set information indicate a pure-translation set-up state.

7. A method of encoding a multi-view picture comprising:
    receiving, by a multi-view picture receiver, a multi-view picture and a plurality of camera parameters;
    selecting a camera parameter to be used for encoding the multi-view picture from among the plurality of the received camera parameters;
    setting information indicating the selected camera parameter; and
    encoding the multi-view picture on the basis of the set information.

8. The method of claim 7, further comprising classifying integrated information, respectively, with camera parameter characteristics including at least one of a camera arrangement type, translation, a rotation angle, a camera focus distance, and a principle point, when a plurality of camera parameters regarding camera characteristics are received as the integrated information.

9. The method of claim 7, wherein, in the selecting of the camera parameter to be used for encoding the multi-view picture among the plurality of the received camera parameters, the camera parameter is selected according to the frequency of transmission of the plurality of the received camera parameters.

10. The method of claim 7, wherein the setting of the information which indicates the selected camera parameter further comprises setting information which indicates whether or not a camera parameter has changed, and in the encoding of the multi-view picture, if the information which indicates whether or not the camera parameter has changed indicates that the camera parameter has not changed, the multi-view picture is encoded without using a camera parameter previously transmitted.

11. The method of claim 7, wherein the information indicating the selected camera parameter is flag information, and is set in a unit of a slice or in a unit of a macroblock of each picture.

12. The method of claim 7, wherein the encoding of the multi-view picture on the basis of the set information comprises estimating a disparity vector between a predetermined point of a current encoding frame and a corresponding point of a first reference frame using a disparity vector between the predetermined point of the current encoding frame and a corresponding point of a second reference frame when the set information and a camera parameter according to the set information indicate a pure-translation set-up state.

13. An apparatus for decoding a multi-view picture comprising:
a computer readable storage medium having stored thereon a camera parameter information extractor and a decoder;
wherein the camera parameter information extractor extracts camera parameter information including information set for transmitted camera parameters and the transmitted camera parameters from a multi-view picture encoded using selected camera parameters; and
wherein the decoder decodes the multi-view picture on the basis of the extracted camera parameter information, and
wherein the decoder decodes the multi-view picture on the basis of the extracted camera parameter information if information indicating that a camera parameter has changed is extracted from the camera parameter information extractor, and decodes the multi-view picture using a camera parameter previously received if information indicating that the camera parameter has not changed is extracted from the camera parameter information extractor.

14. The apparatus of claim 13, wherein the information set for the used camera parameters is flag information, and is set in a unit of a slice or in a unit of a macroblock of each picture.

15. A method of decoding a multi-view picture comprising:
extracting, a camera parameter information extractor, camera parameter information including information set for transmitted camera parameters and the transmitted camera parameters from a multi-view picture encoded using selected camera parameters; and
decoding, by the camera parameter information extractor, the multi-view picture on the basis of the extracted camera parameter information,
wherein the decoding of the multi-view picture further comprises decoding the multi-view picture on the basis of the extracted camera parameter information if information indicating that a camera parameter has changed is extracted from the encoded multi-view picture, and decoding the multi-view picture using a camera parameter previously received if information indicating that the camera parameter has not changed is extracted from the encoded multi-view picture.

16. The method of claim 15, wherein the information set for the used camera parameters is flag information, and is set in a unit of a slice or in a unit of a macroblock of each picture.

17. A tangible, non-transitory, computer-readable medium storing executable instructions that when executed cause a computer to perform a method of encoding a multi-view picture comprising:
receiving a multi-view picture and a plurality of camera parameters;
selecting a camera parameter to be used for encoding the multi-view picture from among the plurality of the received camera parameters;
setting information indicating the selected camera parameter; and
encoding the multi-view picture on the basis of the set information.

18. The computer readable recording medium of claim 17, further comprising classifying integrated information, respectively, with camera parameter characteristics including at least one of a camera arrangement type, translation, a rotation angle, a camera focus distance, and a principle point, when a plurality of camera parameters regarding camera characteristics are received as the integrated information.

19. The computer readable recording medium of claim 17, wherein, in the selecting of the camera parameter to be used for encoding the multi-view picture among the plurality of the received camera parameters, the camera parameter is selected according to the frequency of transmission of the plurality of the received camera parameters.

20. The computer readable recording medium of claim 17, wherein the setting of the information which indicates the selected camera parameter further comprises setting information which indicates whether or not a camera parameter has changed, and
in the encoding of the multi-view picture, if the information which indicates whether or not the camera parameter has changed indicates that the camera parameter has not changed, the multi-view picture is encoded without using a camera parameter previously transmitted.

21. The computer readable recording medium of claim 17, wherein the information indicating the selected camera parameter is flag information, and is set in a unit of a slice or in a unit of a macroblock of each picture.

22. The computer readable recording medium of claim 17, wherein the encoding of the multi-view picture on the basis of the set information comprises estimating a disparity vector between a predetermined point of a current encoding frame and a corresponding point of a first reference frame using a disparity vector between the predetermined point of the current encoding frame and a corresponding point of a second reference frame when the set information and a camera parameter according to the set information indicate a pure-translation set-up state.

23. A tangible, non-transitory, computer-readable medium storing executable instructions that when executed cause a computer to perform a method of decoding a multi-view picture comprising:
extracting camera parameter information including information set for transmitted camera parameters and the transmitted camera parameters from a multi-view picture encoded using selected camera parameters; and
decoding the multi-view picture on the basis of the extracted camera parameter information,
wherein the decoding of the multi-view picture further comprises decoding the multi-view picture on the basis of the extracted camera parameter information if information indicating that a camera parameter has changed is extracted from the encoded multi-view picture, and decoding the multi-view picture using a camera parameter previously received if information indicating that the camera parameter has not changed is extracted from the encoded multi-view picture.

24. The computer readable recording medium of claim 23, wherein the information set for the used camera parameters is flag information, and is set in a unit of a slice or in a unit of a macroblock of each picture.

* * * * *